United States Patent [19]

Gustafsson

[11] Patent Number: 4,780,804

[45] Date of Patent: Oct. 25, 1988

[54] METHOD AND AN ARRANGEMENT FOR ENABLING THE MAGNETIZING CURRENT PASSING THROUGH A TRANSFORMER TO BE MINIMIZED WHEN AN ASYMMETRIC LOAD IS APPLIED TO THE SECONDARY SIDE OF THE TRANSFORMER

[75] Inventor: Alf G. Gustafsson, Växjö0, Sweden

[73] Assignee: Fläkt AB, Nacka, Sweden

[21] Appl. No.: 134,557

[22] Filed: Dec. 15, 1987

Related U.S. Application Data

[63] Continuation of Ser. No. 858,734, May 2, 1986, abandoned.

[30] Foreign Application Priority Data

May 23, 1985 [SE] Sweden ............................... 8502543

[51] Int. Cl.[4] ............................................ H02M 7/155

[52] U.S. Cl. ..................................... 363/128; 363/28; 363/139; 323/903; 55/105

[58] Field of Search ....................... 363/21, 27, 28, 85, 363/86, 88, 128, 139; 323/235, 239, 268, 903; 328/32

[56] References Cited

U.S. PATENT DOCUMENTS

| | | | |
|---|---|---|---|
| 2,841,239 | 7/1958 | Hall | 328/32 |
| 4,348,734 | 9/1982 | Dougherty | 363/41 |
| 4,368,419 | 1/1983 | Welty | 363/86 |
| 4,587,475 | 5/1986 | Finney, Jr. et al. | 323/903 |

FOREIGN PATENT DOCUMENTS

| | | | |
|---|---|---|---|
| 2050368 | 4/1972 | Fed. Rep. of Germany | 323/320 |

*Primary Examiner*—Patrick R. Salce
*Assistant Examiner*—Judson H. Jones
*Attorney, Agent, or Firm*—Burns, Doane, Swecker & Mathis

[57] ABSTRACT

The invention relates to a method and to an arrangement for controlling the respective conduction times of two directionally opposed electrical devices (9,10) which are mutually connected in parallel and permit current to pass therethrough solely in one direction, and which also permit current ($I_2$) to pass through the primary winding (2) of a transformer during a respective half-period of an A.C. voltage ($U_1$) applied to the primary winding, this control being effected so that the magnetizing current through the transformer can be advantageously minimized and/or held beneath a given limit value when an asymmetric load (4,5) is applied to the secondary side (3) of the transformer. A magnetizing current in the primary winding corresponding to the load (5) of the secondary winding (3) is controled through the agency of different conduction times of the two directionally opposed devices (9,10).

39 Claims, 1 Drawing Sheet

METHOD AND AN ARRANGEMENT FOR ENABLING THE MAGNETIZING CURRENT PASSING THROUGH A TRANSFORMER TO BE MINIMIZED WHEN AN ASYMMETRIC LOAD IS APPLIED TO THE SECONDARY SIDE OF THE TRANSFORMER

This application is a continuation of application Ser. No. 858,734, filed May 2, 1986, now abandoned.

TECHNICAL FIELD

According to a first aspect the invention relates to a method of preventing magnetic saturation in a transformer core by limiting or minimizing the magnetizing current in the primary winding of said transformer by controlling the respective conduction times of two directionally opposed electrical devices which are mutually connected in parallel and allow current to pass therethrough in solely one direction and which permit current to pass through the secondary winding of a transformer during a respective half period of an A.C. voltage connected to the primary winding of the transformer, this control being effected in a manner which when an asymmetric load is applied to the secondary side of the transformer enables the magnetizing current passing through the transformer to be minimized and/or at least adjusted so as to maintain the amplitude of the magnetizing current beneath a given limit value.

According to a second aspect the invention relates to an arrangement for controlling the respective conduction times of two directionally opposed electrical devices which are mutually connected in parallel and permit current to pass in solely one direction therethrough, in a manner such that the magnetizing current through a transformer can be minimized and/or held beneath a given limit value when an asymmetric load is applied to the secondary side of the transformer.

The reference to "controlling the conduction time" does not solely apply to controlling and adjusting the time for which respective devices are held conductive, but also applies to control of the trigger time and/or blocking time of the devices, by which is meant the time at which the devices are made active or conductive and the time at which they are rendered inactive or non-conductive. Reference to control of the conduction time also includes control and adjustment of the voltage integral occurring between a given trigger time and a following blocking time.

BACKGROUND PRIOR ART

It is known that when a symmetric loaad is applied to the secondary side of a transformer, or when the secondary side has no load thereon, for example when the transformer idles, the magnetizing current required to sustain magnetization of the transformer core obtains the form of brief current pulses occurring periodically in dependence on the A.C. voltage applied, wherewith two mutually sequential current pulses of brief duration are substantially symmetrical in relation to a zero level.

It is also known that when a transformer is loaded asymmetrically on its secondary side, i.e. when current is taken from the secondary side of the transformer in solely one predetermined direction while current in the other direction is blocked by a device through which current can flow in solely one direction, e.g. a D.C. rectifier, that the magnetizing current through the transformer will have an asymmetric form, and in particular that each alternate current pulse will have an extremely high amplitude, while each other or intermediate pulse will have a considerably reduced amplitude. This also applies to the case of an asymmetric primary voltage.

It has also been established earlier that the time positions of the magnetizing current pulses appear at the zero-crossing points of the primary A.C. voltage, both when the load is symmetrical and asymmetrical.

It is also known that an asymmetric load which is constant in time can be balanced with the aid of a diode arrangement on the primary side, although this solution is not successful when the load varies. It is also known that overheating of the transformer, due to a high magnetizing current, can be avoided with the aid of electrical devices connected in series, e.g. resistors or inductances incorporated in the primary circuit, although this solution does not enable the transformer to be utilized to the full and normally significant energy losses are experienced in the series-connected devices.

SUMMARY OF THE INVENTION

TECHNICAL PROBLEM

The present invention is used in an electrical arrangement of the kind which comprises an electric circuit incorporating two directionaly opposed electrical devices which are mutually connected in parallel and permit current to pass therethrough in solely one direction, and which permit current to pass through the primary winding of a transformer, during a respective half-period of an A.C. voltage applied to the primary winding, and in which arrangement an asymmetric load is connected to the secondary side of the transformer.

One technical problem prominent in electrical switching arrangements of this kind resides in providing ways and means of advantageously minimizing the magnetizing current and/or holding the magnetizing current beneath a given limit value, i.e. to enable the amplitude of each alternate current pulse to be reduced and the amplitude of each other or intermediate pulse to be increased.

Another qualified technical problem is one of providing conditions in which the magnetizing current can be minimized even when an asymmetric load which varies with time is applied to the secondary side of the transformer.

A further technical problem in the present context is one of enabling the transformer to be utilized more efficiently with the aid of simple means when an asymmetric load is applied to the secondary side of the transformer.

A further technical problem is one of providing conditions which render it unnecessary for the transformer core to pass beyond the saturation point even when the load on the secondary side of the transformer is asymmetric; it will be understood that saturation of the transformer core will result in current pulses of such amplitude as to cause undesirable heating of the transformer.

Another qualified technical problem is one of enabling through the agency of simple means the momentary state of magnetization of the transformer to be evaluated, and not solely the change in magnetization, so that steps can be taken to minimize the amplitude of the magnetizing current and/or to hold said amplitude beneath a given limit value.

It will be understood that a further technical problem in the present context is one of providing simple means capable of minimizing the magnetizing current and/or of holding the amplitude of the current beneath a predetermined limit value in the aforesaid manner, and still provide conditions which enable the magnetizing current to be adjusted continuously in dependence on the load on the secondary transformer winding and/or on the nature of the load, particularly when the load is arranged for different power outputs in time and/or exhibits loading characteristics which vary with time.

Since an electrostatic precipitator can, in many instances, be considered to constitute an asymmetric capacitive load connected to a transformer, a further technicl problem resides in the provision of conditions of the aforesaid kind which, in the operation of electrostatic precipitators, enable the losses in the transformer and the rise in temperature therein, due to high asymmetric magnetizing currents, to be held at a low level, particularly in those cases when the precipitator is operated at power consumptions which vary markedly with time, or with alternating polarities.

SOLUTION

The present invention relates to a method and to an arrangement for preventing magnetic saturation in a transformer core by limiting or minimizing the magntizing current in the primary winding of said transformer by controlling the respective conduction times of two directionally opposed electrical devices which are mutually connected in parallel and permit current to pass therethrough in only one direction and which also permit current to pass to the primary winding of a transformer during a respective half-period of an A.C. voltage applied to the primary winding, so that when an asymmetric load is applied to the secondary side of the transformer the magnetizing current through the transformer can be minimized and/or held beneath a given limit value.

When practising the method or using the apparatus according to the invention the magnetizing current flowing in the primary winding and corresponding to the load on the secondary winding is controlled through the agency of different conduction times in respect of the two directionally opposed devices.

Thus, the present invention enables the power output to the asymmetric load on the secondary side of the transformer to be readily adjusted or controlled.

In accordance with one preferred embodiment, the prevailing magnetizing current is measured and/or calculated in order to be able to establish one and/or both peak values of the magnetizing current, and/or to be able to establish a value which constitutes the integral of the curve form of the magnetizing current above and/or beneath a reference level, normally a zero level.

In accordance with a further embodiment of the invention the relationship between the respective conduction times of the two electrical devices is adapted to achieve minimization of the magnetizing current, which means essentially that two mutually sequential current pulses will have the same amplitude or that the energy content of two mutually sequential current pulses will be minimized.

The relationship between the respective conduction times of the two electrical device is suitably adapted to hold the amplitudes of the brief current pulses associated solely with the magnetizing current beneath a given value.

It is also proposed in accordance with the invention that in the case of a resistive load the prevailing primary current is measured at the zero-crossing point of the A.C. voltage, and that a current value thus established which exceeds a predetermined value is instrumental in increasing the conduction time of a respective device during the next-following half-period. The primary current measured at the A.C. voltage zero-crossing point may also be made the subject of comparison between two mutually sequential values, and when these are used to control the conduction times of respective devices in a manner such that the sum of two mutually sequential values obtains a tendency towards a minimum.

In accordance with a further embodiment of the invention, which affords particular advantage in respect of inductive or capacitive loads, the primary current and the secondary current are measured and a quotient formed between said primary and secondary currents, this quotient, or ratio, either being formed from momentarily occurring values or constituting the integral of the current during a half-period, wherewith said quotient can be used as a control parameter for adjusting the respective conduction times of the aforesaid electrical devices.

The quotient can be established by evaluating momentary current values occurring in time at the zero-crossing point of the A.C. voltage.

In practice, the actual devices may comprise phase-controlled D.C. rectifiers, so-called thyristors, the firing angle or duration of which is normally regulated so that the conduction time is terminated at the zero-crossing point of the A.C. voltage. A particular advantage is gained when the devices can be controlled in a manner to achieve a regulated trigger time and a regulated blocking time, these trigger and blocking times being established with the aid of a microprocessor.

It has also been found that an advantage is gained when the momentary value of the primary current is measured from 10 to 1000 times during each half-period, preferably 100–500 times per half-period.

In accordance with one advantageous embodiment of the invention, the momentary value measured immediately prior to the zero-crossing point of the A.C. voltage, or alternatively immediately after said zero-crossing point, is used as a parameter for controlling the respective conduction times of the electrical devices.

The present invention is primarily intended to create, with the aid of a specific method and an arrangement adapted thereto, conditions which enable energy to be supplied to an electrostatic precipitator connected to the secondary winding of a transformer such as to asymmetrically load the transformer, in a simple and ready manner and with the lowest possible energy loss.

ADVANTAGES

The advantages primarily afforded by a method and an apparatus according to the invention reside in the provision of conditions which enable magnetizing current asymmetry to be constantly minimized and/or the amplitudes of the current pulses of short duration associated with the magnetizing current to be held beneath a given value, irrespective of variations in the magnitude of the asymmetric load applied to the secondary side of the transformer, or of the nature of said load. The invention affords a particular advantage when the aforesaid load comprises an electrostatic precipitator exhibiting pronounced capacitive characteristics and having a power consumption which varies widely in time.

The primary characteristic features of a method according to the invention are set forth in the characterizing clause of claim 1 while the primary characteristic features of an arrangement according to the invention are set forth in the characterizing clause of claim 15.

BRIEF DESCRIPTION OF THE DRAWINGS

The fundamental principle of the invention and its method of application in conjunction with an electrostatic precipitator is illustrated more specifically in the following description, given with reference to the accompanying drawings, in which.

DESCRIPTION OF A PREFERRED EMBODIMENT

Figure 1:
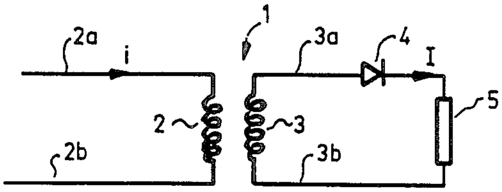
FIG. 1 PRIOR ART
FIG. 1 is a simple circuit diagram illustrating an asymmetrically loaded transformer.

The circuit of FIG. 1 includes a transformer 1 incorporating a primary winding 2 and a secondary winding 3 and, although not shown, also incorporates transformer plates for conducting the magnetic field generated.

A primary A.C. voltage is connected to the primary winding 2 through a conductor **2*a* and a conductor 2*b* connected thereto, and a secondary A.C. voltage occurs on conductors 3*a* and 3*b* connected to the secondary winding 3, which secondary A.C. voltage can be connected across a load 5, via diode 4**.

Thus, current can only flow in the secondary circuit 3 in the direction of the arrow I, and hence magnetization in the transformer 1 is not symmetrical, but substantially unidirectional. A circuit incorporating a diode 4 and a load 5 is hereinafter referred to as an asymmetric load on the secondary side of the transformer.

Figure 2:
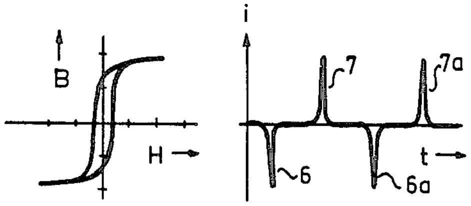
FIG. 2 PRIOR ART
FIG. 2 illustrates a symmetric magnetization curve and an associated magetizing current in the form of alternate positive and negative current pulses of uniform short duration.

In FIG. 2 the magnetization current i in the primary winding 2 of the transformer 1 is shown as a function of the time during which the transformer 1 is symmetrically loaded, i.e. the diode 4 is short-circuited or there is no load on the secondary winding 3.

It will be see from FIG. 2 that each alternate current pulse 6, **6*a* is negative and that each other or intermediate current pulse 7, 7*a* is positive. It will also be seen from FIG. 2 that the pulses 6,6*a* and 7,7*a*** are symmetrically distributed relative to one another in time.

Figure 3:
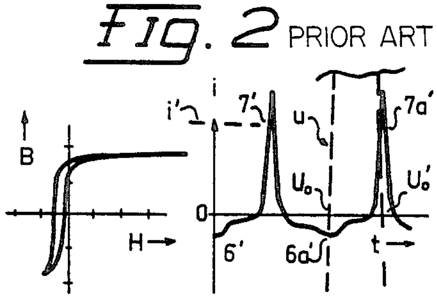
FIG. 3 PRIOR ART
FIG. 3 illustrates an asymmetric magnetization curve applicable when an asymmetric load is applied to the secondary side of the transformer, and also illustrates the occurring magnetization currents, where each alternate current pulse exhibits a pulse of high amplitude and short duration and each other or intermediate current pulse exhibits a current pulse of low amplitude and long duration.

If, however, an asymmetric load is connected in accordance with FIG. 1 a change takes place in the magnetizing current, and FIG. 3 illustrates firstly imaginary magnetization of the transformer core and secondly that each alternate current pulse 6', **6*a*' has an extremely low amplitude and is of long time-duration, whereas the current pulses 7' and 7*a*' comprise a current pulse of very high amplitude and short time-duration. It should be noted here that FIG. 3** illustrates the principle of asymmetric magnetization with a transposed loading current in the secondary circuit subtracted from the current in the primary circuit.

It will be readily seen that the current pulses 7 and **7*a*'** magnetize the transformer core far beyond its saturation point, thus resulting in transformer losses in the form of heat, due to the resultant very high current in the primary winding.

This is due to the fact that any circuit which incorporates magnetic components and supplied with A.C. voltage symmetrically about a zero level will conduct a current having a time integral of equal magnitude during the two half-periods.

Figure 4:
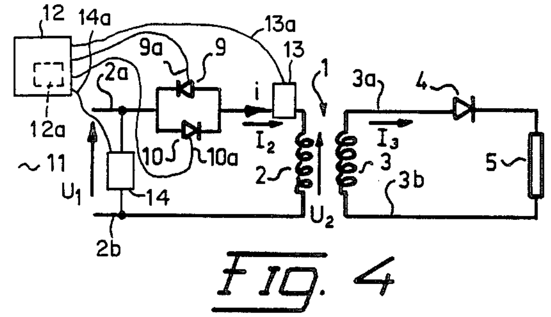
FIG. 4 illustrates schematically a circuit diagram of an arrangement according to the invention for minimizing the magnetizing current and/or maintaining the amplitude of the magnetizing current beneath a given limit value.

FIG. 4 illustrates a circuit arrangement according to the invention which incorporates two directionally opposed devices, which in the illustrated embodiment are assumed to have the form of phase controlled rectifiers or like devices, such as thyristors 9,10, which are mutually connected in parallel in the conductor **2*a* and each permit current to pass solely in one respective direction, the thyristors being arranged to permit current to flow through the primary winding during each respectivehalf-period of an A.C. voltage 11** applied to the primary winding.

The present invention enables the conduction time, either the duration of conductivity or the trigger time as hereinbefore defined, for each of the thyristors 9 and 10 to be so controlled as to enable the magnetizing current i flowing through the primary winding 2 of the transformer 1 to be minimized and/or held beneath a given limit value when the secondary side of the transformer is loaded asymmetrically.

In accordance with the invention, each thyristor is connected via a respective conductor **9*a* and 10*a* to a control means, 12 incorporating a microprocessor 12*a*** for establishing the trigger times of respective thyristors. A circuit suitable for this purpose is illustrated and described in U.S. Pat. No. 4,486,704.

According to the present invention the magnetizing current i corresponding to the load 5 on the secondary winding 3 is regulated through the different conduction times of the directionally opposed devices.

The prevailing magnetizing current i can be measured either directly and/or calculated in the control means, in order to be able to establish one and/or both peak values of the magnetizing current, i.e. the peaks of the current pulses 7', **7*a*' and 6', 6*a*'** respectively, and/or in order to establish a value which constitutes the integral of the curve shape or form of the magnetizing current above and/or beneath a reference level, which is normally the zero level.

It is important that the trigger times and blocking times of the two thyristors, i.e. the times at which the thyristors are made conductive and non-conductive respectively, are adapted towards minimization of the magnetizing current.

The relationship between the conduction times of respective devices are adapted so that the amplitudes 7' of the pulses of short duration associated solely with the magnetizing current are held beneath a predetermined value, referenced i' in FIG. 2.

The prevailing primary current, and in particular the magnetizing current, can be measured by a suitable current measuring means 13 at the zero-crossing point, as measured by suitable voltage measuring means 14, $U_O$, $U_O'$ of the A.C. voltage in FIG. 3, and an established current value which exceeds a given value results in a signal 13*a* being sent to the control means instructing the same to increase the conduction time of the thyristor 9 or the thyristor 10 during the next half-period. A signal 14*a* from the voltage measuring means 14 indicates to the control means 12 the zero-crossing points of the A.C. voltage.

The prevailing primary current can also be measured at the zero-crossing point of the A.C. voltage and a comparison made between two mutually sequential values, the result of this comparison being used to control the thyristor conduction time such that the sum of two mutually sequential values tends towards a minimum.

It is possible with the aid of the control means described in the aforesaid U.S. patent specification to measure the value of the primary current and of the secondary current, and to form a quotient between said primary and secondary currents. The subject of this comparison may be either the occurring values and/or the change in respective current pulses, and the comparison may be made by integrating the current pulse during a half-period. The resultant quotient is then used in the control means as a control parameter for adjusting the respective conduction times of the thyristors.

A particular advantage is afforded when, in accordance with the invention, the quotient is established by evaluating current values occurring momentarily at the zero-crossing point of the A.C. voltage. The times at which the thyristors are made conductive, i.e. triggered, and the conduction times of said thyristors may be controlled by a microprocessor included in the control means, so that the thyristors are triggered at the zero-crossing points of the A.C. voltage.

Specially designed thyristors enable the times at which the thyristors are triggered and blocked to be adjusted irrespective of the zero-crossing point of the A.C. voltage.

This evaluation of the trigger times and/or blocking times of the thyristors is effected here with the aid of the microprocessor incorporated in the control means. Such evaluation, however, lies within the expertise of those skilled in this art and will not therefore be described in detail here.

An advantage is also gained when the momentary value of the primary current is measured a number of times during each half-period. Accordingly, it is proposed in accordance with one embodiment of the invention that the momentary value of the primary current is measured from 10 to 1000 times during each half-period, preferably from 100–500 times per half-period.

In accordance with one beneficial embodiment, the momentary value of the primary current occurring immediately before the zero-crossing point of the A.C. voltage is used as a parameter for controlling respective thyristor conduction times, although the momentary current values prevailing immediately after the zero-crossing point may also be used as said control parameter.

Figure 5:
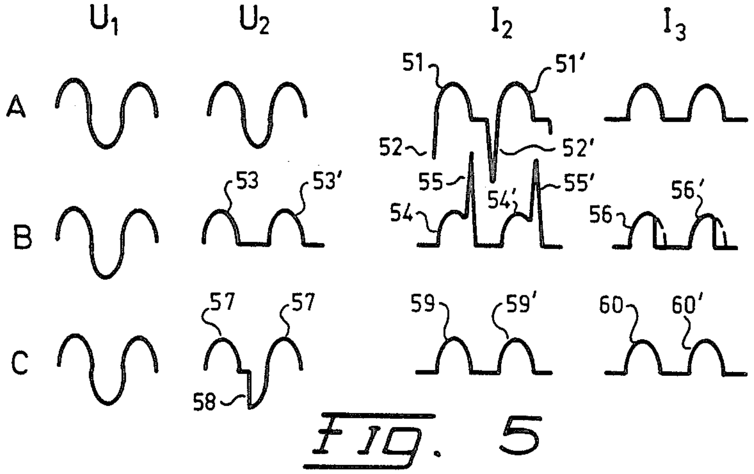
FIG. 5 illustrates the various shapes of voltages and current occurring in the circuit illustrated in FIG. 4 when applying an asymmetric load to the secondary winding of the transformer.

FIG. 5 illustrates in three-part illustrations the wave forms or shapes of various voltages and currents occurring in the circuit illustrated in FIG. 4 when an asymmetric load is connected to the secondary winding of the transformer.

In FIG. 5 the reference $U_1$ designates the mains voltage applied to the transformer; $U_2$ designates the voltage applied to the primary winding 2 of the transformer; $I_2$ designates the current flowing through the primary winding 2; and $I_3$ designates the current flowing through the seconday winding 3.

Of the three part-illustrations A,B,C in FIG. 5, A illustrates the state when the thyristors 9,10 are fully conductive and the diode 4 is connected-up for an asymmetric load on the secondary winding. As a result, the current $I_2$ through the primary winding obtains a highly pronounced, downwardly directed "spike" 52' of short duration after each positive current pulse 51, 52.

The current $I_2$ in the primary circuit is useful solely during the positive half-periods 51,51', and because the time interval shall be equal for both half-periods 51 and 52, a heavy power loss develops in the primary winding of the transformer during the negative half-periods, despite the fact that no current flows through the load 5.

The part-illustration B illustrates the state of the circuit when solely the thyristor 10 is conductive, whereby the voltage $U_2$ obtains the form of pulses 53,53'.

These pulses 53,53' means that each current pulse 54,54' of the current $I_2$ passing through the primary winding will exhibit a terminating, upwardly directed highly pronounced "spike" 55 and 55' of short duration, resulting in heavy power losses.

In this particular case the duration of the current pulses 56,56' in the secondary circuit $I_3$ is also slightly shortened.

In the part-illustration C the thyristor 10 is conductive and transfers the positive voltage pulses 57,57' to the primary winding. In addition, the thyristor 9 is controlled with respect to time such as to transfer a negative part of a voltage pulse 58 to the primary winding.

As a result of this adjustment the current pulses 59,59' pass through the primary winding in the absence of "spikes", and the current pulses 60,60' through the secondary winding become symmetrical, as with the part-illustration A of FIG. 5.

Figure 6:
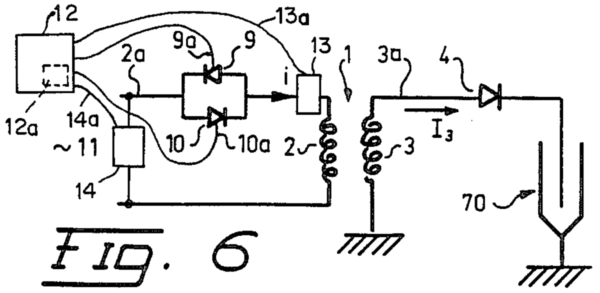
FIG. 6 is a schematic illustration of the invention when applied to an electrostatic precipitator.

FIG. 6 is a simplified circuit diagram of an arrangement according to the invention intended for controlling an electrostatic precipitator 70.

Precipitators of this kind are highly capacitive and the loading current $I_3$ varies greatly with time.

In this case it is important to adjust the thyristors 9,10 so that it is possible not only to maintain the variations in loading current, but also to maintain symmetrical current pulses 59,59' through the primary winding.

By evaluating the shape or form of the current pulses, it is possible to control the trigger times of respective thryistors 9,10 with the aid of the microprocessor 12*a* in a manner to enable the losses in the transformer to be minimized.

It will be understood that the invention is not restricted to the aforedescribed exemplifying embodiment and that modifications can be made within the scope of the following claims.

I claim:

1. In an electrical system comprising a transformer having a primary winding and a secondary winding, an asymmetric load applied to the secondary winding, and two directionally opposed electrical devices mutually connected in parallel, each electrical device permitting current to pass through the primary winding during a respective half-period of an A.C. voltage applied to the primary winding and each device permitting current to pass therethrough in solely one direction during a controllable conduction time, a method for selectively controlling a magnetizing current flowing in the primary winding in correspondence with the asymmetric load, comprising the steps of:

- providing mutually different conduction times in the two electrical device when the secondary winding supplies current to the asymmetric load;
- measuring the prevailing primary current at a zero-crossing point of the A.C. voltage; and
- using a value so established which exceeds a given magnitude to increase the conduction time of the device conducting during the next following half period.

2. The method of claim 1, wherein mutually different conduction times are provided in the two electrical devices when the secondary supplies current to the asymmetric load in one predetermined direction.

3. In an electrical system comprising a transformer having a primary winding and a secondary winding, an asymmetric load applied to the secondary winding, and two directionally opposed electrical devices mutually connected in parallel, each electrical device permitting current to pass through the primary winding during a respective half-period of an A.C. voltage applied to the primary winding and each device permitting current to pass therethrough in solely one direction during a controllable conduction time, a method for selectively controlling a magnetizing current flowing in the primary winding in correspondence with the asymmetric load, comprising the steps of:

- providing mutually different conduction times in the two electrical devices when the secondary winding supplies current to the asymmetric load;
- measuring the current prevailing at a zero-crossing point of the A.C. voltage and making a comparison between two mutually sequential measured values, the comparison yielding a result; and
- utilizing the result of this comparison to control the conduction times of said devices in a manner such that a sum of two mutually sequential measured values tends towards a minimum.

4. The method of claim 3, wherein mutually different conduction times are provided in the two electrical devices when the secondary supplies current to the asymmetric load in one predetermined direction.

5. In an electrical system comprising a transformer having a primary winding and a secondary winding, an asymmetric load applied to the secondary winding, and two directionally opposed electrical devices mutually connected in parallel, each electrical device permitting current to pass through the primary winding during a respective half-period of an A.C. voltage applied to the primary winding and each device permitting current to pass therethrough in solely one direction during a controllable conduction time, a method for selectively controlling a magnetizing current flowing in the primary winding in correspondence with the asymmetric load, comprising the steps of:

- providing mutually different conduction times in the two electrical devices when the secondary winding supplies current to the asymmetric load;
- measuring the primary current and the secondary current;
- establishing a quotient between the primary current and the secondary current, preferably either momentarily and/or integrated during a half-period; and
- using the quotient as a control parameter for adjusting respective conduction times of the directionally opposed devices.

6. A method according to claim 5, wherein the quotient is established by evaluating the momentary current values occurring in time at a zero-crossing point of the A.C. voltage.

7. The method of claim 5, wherein mutually different conduction times are provided in the two electrical devices when the secondary supplies current to the asymmetric load in one predetermined direction.

8. In an electrical system comprising a transformer having a primary winding and a secondary winding, an asymmetric load applied to the secondary winding, and two directionally opposed electrical devices mutually connected in parallel, each electrical device permitting current to pass through the primary winding during a respective half-period of an A.C. voltage applied to the primary winding and each device permitting current to pass therethrough in solely one direction during a controllable conduction time, a method for selectively controlling a magnetizing current flowing in the primary winding in correspondence with the asymmetric load, comprising the steps of:

- providing mutually different conduction times in the two electrical devices when the secondary winding supplies current to the asymmetric load; and
- measuring a momentary value of the primary current from 10 to 1000 times during each half-period, preferably from 100 to 500 times per half-period.

9. A method according to claim 8, further including the step of using the momentary value occurring immediately prior to a zero-crossing point of the A.C. voltage as a parameter for controlling the conduction time of respective devices.

10. A method according to claim 8, further including the step of using the momentary value occurring immediately after a zero-crossing point of the A.C. voltage as a parameter for controlling the conduction time of respective devices.

11. The method of claim 8, wherein mutually different conduction times are provided in the two electrical devices when the secondary supplies current to the asymmetric load in one predetermined direction.

12. An arrangement for selectively controlling a magnetizing current, comprising:

- a transformer having a primary winding and a secondary winding, the magnetizing current flowing through the primary winding;
- an asymmetric load applied to the secondary winding, the asymmetric load being supplied current from the secondary winding;
- two directionally opposed electrical devices mutually connected in parallel, each device permitting the magnetizing current to pass through the primary winding in correspondence with the asymmetric load during a respective half-period of an A.C. voltage applied to the primary winding and each device permitting current to pass therethrough in solely one direction during a controllable conduction time; and control means operatively connected to the two electrical devices for controlling the conduction times of the two devices, the control means providing mutually different conduction times in the two electrical devices;

wherein the prevailing primary current is measured at a zero-crossing point of the A.C. voltage and a measured value which exceeds a given value is used to increase the conduction times of respective devices during the next following half-period.

13. The arrangement of claim 12, wherein the asymmetric load is supplied current in one predetermined direction from the secondary winding.

14. An arrangement for selectively controlling a magnetizing current, comprising:

a transformer having a primary winding and a secondary winding, the magnetizing current flowing through the primary winding;

an asymmetric load applied to the secondary winding, the asymmetric load being supplied current from the secondary winding;

two directionally opposed electrical devices mutually connected in parallel, each device permitting the magnetizing current to pass through the primary winding in correspondence with the asymmetric load during a respective half-period of an A.C. voltage applied to the primary winding and each device permitting current to pass therethrough in solely one direction during a controllable conduction time;

control means operatively connected to the two electrical devices for controlling the conduction times of the two devices, the control means providing mutually different conduction times in the two electrical devices;

measuring means for determining the prevailing magnetizing current in order to establish at least one of the peak values of the magnetizing current and for establising a value corresponding to an integral of a curve shape of the magnetizing current with respect to a reference level, wherein the measuring means is arranged to measure the prevailing primary current at a zero-crossing point of the A.C. voltage; and means for comparing two mutually sequential values from the measuring means, a result of this comparison being used to so control the conduction times of respective directionally opposed devices that a sum of two mutually sequential values obtains a tendency towards a minimum.

15. The arrangement of claim 14, wherein the asymmetric load is supplied current in one predetermined direction from the secondary winding.

16. An arrangement for selectively controlling a magnetizing current, comprising:

a transformer having a primary winding and a secondary winding, the magnetizing current flowing through the primary winding;

an asymmetric load applied to the secondary winding, the asymmetric load being supplied current from the secondary winding;

two directionally opposed electrical devices mutually connected in parallel, each device permitting the magnetizing current to pass through the primary winding in correspondence with the asymmetric load during a respective half-period of an A.C. voltage applied to the primary winding and each device permitting current to pass therethrough in solely one direction during a controllable conduction time;

control means operatively connected to the two electrical devices for controlling the conduction times of the two devices, the control means providing mutually different conduction times in the two electrical devices;

means for measuring the primary current;

means for measuring a secondary current;

means for establishing a quotient between the primary and secondary currents, preferably momentarily and/or integrated during a half-period; and means operable in using this quotient as a control parameter for adjusting the respective conduction times of the directionally opposed devices.

17. An arrangement according to claim 16, wherein the quotient is determined by evaluating current values occurring in time at a zero-crossing point of the A.C. voltage.

18. The arrangement of claim 16, wherein the asymmetric load is supplied current in one predetermined direction from the secondary winding.

19. An arrangement for selectively controlling a magnetizing current, comprising:

a transformer having a primary winding and a secondary winding, the magnetizing current flowing through the primary winding;

an asymmetric load applied to the secondary winding, the asymmetric load being supplied current from the secondary winding;

two directionally opposed electrical devices mutually connected in parallel, each device permitting the magnetizing current to pass through the primary winding in correspondence with the asymmetric load during a respective half-period of an A.C. voltage applied to the primary winding and each device permitting current to pass therethrough in solely one direction during a controllable conduction time; and control means operatively connected to the two electrical devices for controlling the conduction times of the two devices, the control means providing mutually different conduction times in the two electrical devices;

wherein a momentary value of the primary current is measured from 10 to 1000 times during each half-period, preferably from 100 to 500 times per half-period.

20. An arrangement according to claim 19, wherein the momentary value occurring immediately prior to a zero-crossing point of the A.C. voltage is used as a parameter for controlling the conduction time of respective directionally opposed devices.

21. An arrangement according to claim 19, wherein the momentary value occurring immediately after a zero-crossing point of the A.C. voltage is used as a parameter for controlling the conduction time of respective devices.

22. The arrangement of claim 19, wherein the asymmetric load is supplied current in one predetermined direction from the secondary winding.

23. In an electrical system comprising a transformer having a primary winding, a core and a secondary winding, an asymmetric load applied to the secondary winding, and two directionally opposed electrical devices mutually connected in parallel, each electrical device permitting current to pass through the primary winding during a respective half-period of an A.C.

voltage applied to the primary winding and each device permitting current to pass therethrough in solely one direction during a controllable conduction time, a method for continuously selectively controlling a magnetizing current flowing in the primary winding in correspondence with the asymmetric load to prevent magnetic saturation of the core, comprising the step of:

continuously providing mutually different conduction times in the two electrical devices when the secondary winding supplies current to the asymmetric load so that a magnetizing current value is kept below a predetermined limit value and the core remains magnetically unsaturated.

24. A method according to claim 23, characterized by measuring and/or calculating the prevailing magnetizing current such as to establish one and/or both peak values of the magnetizing current and/or to establish a value which constitutes the integral of the curve form of the magnetizing current above and/or beneath a reference level (zero level).

25. A method according to claim 23, characterized by adjusting the relationship between the respective conduction times in a manner to minimize the magnetizing current.

26. A method according to claim 23, characterized by adjusting the relationship between the respective conduction times of the two directionally opposed devices in a manner to maintain the amplitudes of the short-duration current pulses exhibited by the magnetizing current beneath a given level.

27. A method according to claim 23, characterized in that said directionally opposed devices are phase controlled rectifiers (thyristors), firing angles or conduction times of which are regulated normally so that the conduction times terminate at zero-crossing points of the A.C. voltage.

28. A method according to claim 23, characterized by controlling said directionally opposed devices both with a regulated trigger time and a regulated blocking time.

29. A method according to claim 23, characterized by evaluating the trigger time and/or the blocking time of respective devices with the aid of a microprocessor.

30. The method of claim 23, wherein mutually different conduction times are provided in the two electrical devices when the secondary supplies current to the asymmetric load in one predetermined direction.

31. A method according to claim 23, or an arrangement according to claim 6 adapted for controlling a transformer, whose secondary winding is connected to an electrostatic precipitator.

32. An arrangement for continuously selectively controlling a magnetizing current to prevent magnetic saturation in a transformer core, comprising:

a transformer having a primary winding, a core and a secondary winding, the magnetizing current flowing through the primary winding;

an asymmetric load applied to the secondary winding, the asymmetric load being supplied current from the secondary winding;

two directionally opposed electrical devices mutually connected in parallel, each device permitting the magnetizing current to pass through the primary winding in correspondence with the asymmetric load during a respective half-period of an A.C. voltage applied to the primary winding and each device permitting current to pass therethrough in solely one direction during a controllable conduction time; and control means operatively connected to the two electrical devices for continuously controlling the conduction times of the two devices, the control means continuously providing mutually different conduction times in the two electrical devices for keeping a value of the magnetizing current below a predetermined limit value and the core magnetically unsaturated.

33. An arrangement according to claim 32, characterized by means for measuring and/or calculating the prevailing magnetizing current in order to establish one and/or both peak values of the magnetizing current, and/or for establishing a value corresponding to the integral of the curve shape or form of the magnetizing current above and/or beneath a reference level (zero level).

34. An arrangement according to claim 32, characterized by means for adjusting the relationship between the respective conduction times of the two directionally opposed devices towards minimization of the magnetizing current.

35. An arrangement according to claim 32, characterized by means for adjusting the relationship between the respective conduction times of the two directionally opposed devices in a manner to maintain the amplitudes of the short-duration pulses associated solely with the magnetizing current beneath a given value.

36. An arrangement according to claim 32, characterized in that the directionally opposed electrical devices have the form of phase controlled rectifiers (thyristors) the firing angle or conduction time of which can normally be adjusted so that the thyristor conduction time terminates at the zero-crossing point of the A.C. voltage.

37. An arrangement according to claim 32, characterized by means for adjusting the trigger times and blocking times of respective directionally opposed devices.

38. An arrangement according to claim 32, characterized in that the trigger times of respective directionally opposed devices and/or the blocking times thereof are evaluated with the aid of a microprocessor.

39. The arrangement of claim 32, wherein the asymmetric load is supplied current in one predetermined direction from the secondary winding.

* * * * *